June 23, 1959 W. B. PAYNE ET AL 2,891,469

CONSECUTIVE NUMBER RECORDING APPARATUS

Filed Sept. 17, 1956 6 Sheets-Sheet 1

INVENTOR.
WALTER B. PAYNE
PAUL J. THUT
BY
Benjamin J. Barish
ATTORNEY

June 23, 1959 W. B. PAYNE ET AL 2,891,469

CONSECUTIVE NUMBER RECORDING APPARATUS

Filed Sept. 17, 1956 6 Sheets-Sheet 2

INVENTOR.
WALTER B. PAYNE
PAUL J. THUT
BY
Benjamin J. Barish
ATTORNEY

June 23, 1959 W. B. PAYNE ET AL 2,891,469

CONSECUTIVE NUMBER RECORDING APPARATUS

Filed Sept. 17, 1956 6 Sheets-Sheet 3

INVENTOR.
WALTER B. PAYNE
PAUL J. THUT
BY
Benjamin J. Barish
ATTORNEY

June 23, 1959 W. B. PAYNE ET AL 2,891,469
CONSECUTIVE NUMBER RECORDING APPARATUS
Filed Sept. 17, 1956 6 Sheets-Sheet 4

INVENTOR.
WALTER B. PAYNE
PAUL J. THUT
BY Benjamin J. Barish
ATTORNEY

INVENTOR.
WALTER B. PAYNE
PAUL J. THUT
BY
Benjamin J. Bausch
ATTORNEY

CONSECUTIVE NUMBER RECORDING APPARATUS

Filed Sept. 17, 1956

INVENTOR.
WALTER B. PAYNE
PAUL J. THUT
BY [signature]
ATTORNEY

United States Patent Office 2,891,469
Patented June 23, 1959

2,891,469

CONSECUTIVE NUMBER RECORDING APPARATUS

Walter B. Payne, Rochester, and Paul J. Thut, Penfield, N.Y., assignors, by mesne assignments, to Burroughs Corporation, Detroit, Mich., a corporation of Michigan Application September 17, 1956, Serial No. 610,240

12 Claims. (Cl. 101—76)

This invention relates to recording apparatus and in particular to rotary recording apparatus incorporating means for controlling the recording elements during each rotational cycle to represent consecutive numbering data.

The present invention is particularly adaptable for incorporation in a novel code recording apparatus described and claimed in an application for Letters Patent Serial No. 556,360 filed December 29, 1955, by Paul J. Thut and Robert W. Beachner, assigned to the same assignee as the present invention, and is accordingly hereinafter described for illustrative purposes as embodied in this type of apparatus.

The apparatus of the aforementioned Thut and Beachner application was described for printing record impressions in the form of fluorescent markings or spots in differential positions on record sheets, such as bank checks, to record data impressions in coded form which could be conveniently sensed by automatic "reading" equipment. While the record impressions of that apparatus were disclosed as being preferably in the form of fluorescent spots, such apparatus could be used for recording the data in other forms, such as perforations, or opaque, conductive, or magnetic markings. The present invention, when incorporated in code recording apparatus, is similarly especially useful for recording the coded information in the form of fluorescent spots but is also adaptable for use in recording the record impressions in others forms.

The apparatus of the aforementioned patent application comprised a rotary recording cylinder and a plurality of recording elements settable in differential positions along the circumference of the cylinder in accordance with the data to be recorded. As record sheets, such as bank checks, were individually fed into recording position with respect to the cylinder, a cycle of rotation of the cylinder was initiated, whereby its recording elements applied code impressions to the checks in differential positions corresponding to the differentially set positions of the recording elements. The arrangement was such that the recording elements could be set either manually or automatically. Manual setting was specifically illustrated inasmuch as the particular use for the apparatus described was for applying data which is normally the same for all checks in a batch but which may be desired to be changed for different batches. An illustration of that application was coding the account number of a bank customer on a supply of blank checks so that it appeared on all checks written by that customer.

The present invention is particularly suitable for use in the above-mentioned apparatus in that it automatically sets the recording elements to different differential positions during each rotational cycle of the rotary cylinder to represent consecutive numbering data to be applied to the blank checks. An illustration of this use of the apparatus is coding consecutive serial numbers to a supply of blank checks.

An object of the present invention, therefore, is to provide code recording apparatus having means for automatically controlling the recording elements to represent consecutive numbering data.

The consecutive numbering mechanism herein described is not limited to use with coding recorders. Accordingly, another object of the invention is to provide improved mechanism for automatically advancing or changing the recording elements of recording apparatus in general to correspond to consecutive numbering data.

In the drawings illustrating the invention as embodied in the code recording apparatus of the aforementioned Thut and Beachner applications:

As mentioned earlier, the present invention is herein described for illustrative purposes as incorporated in apparatus generally similar to the above-cited Thut and Beachner patent application Serial No. 556,360. That in turn is somewhat similar to the apparatus, and utilizes some of the control mechanisms, disclosed in Payne Patent No. 2,071,139, issued February 16, 1937, and assigned to the same assignee as the present invention. For purposes of simplifying the description of the instant invention, the overall apparatus of the aforementioned patent application and patent will be but briefly described, with those similar elements illustrated herein but not forming a part of this invention being correspondingly numbered. Those elements and mechanisms which enter into the novel aspects of the present invention will be numbered beginning with "500."

Figure 3:
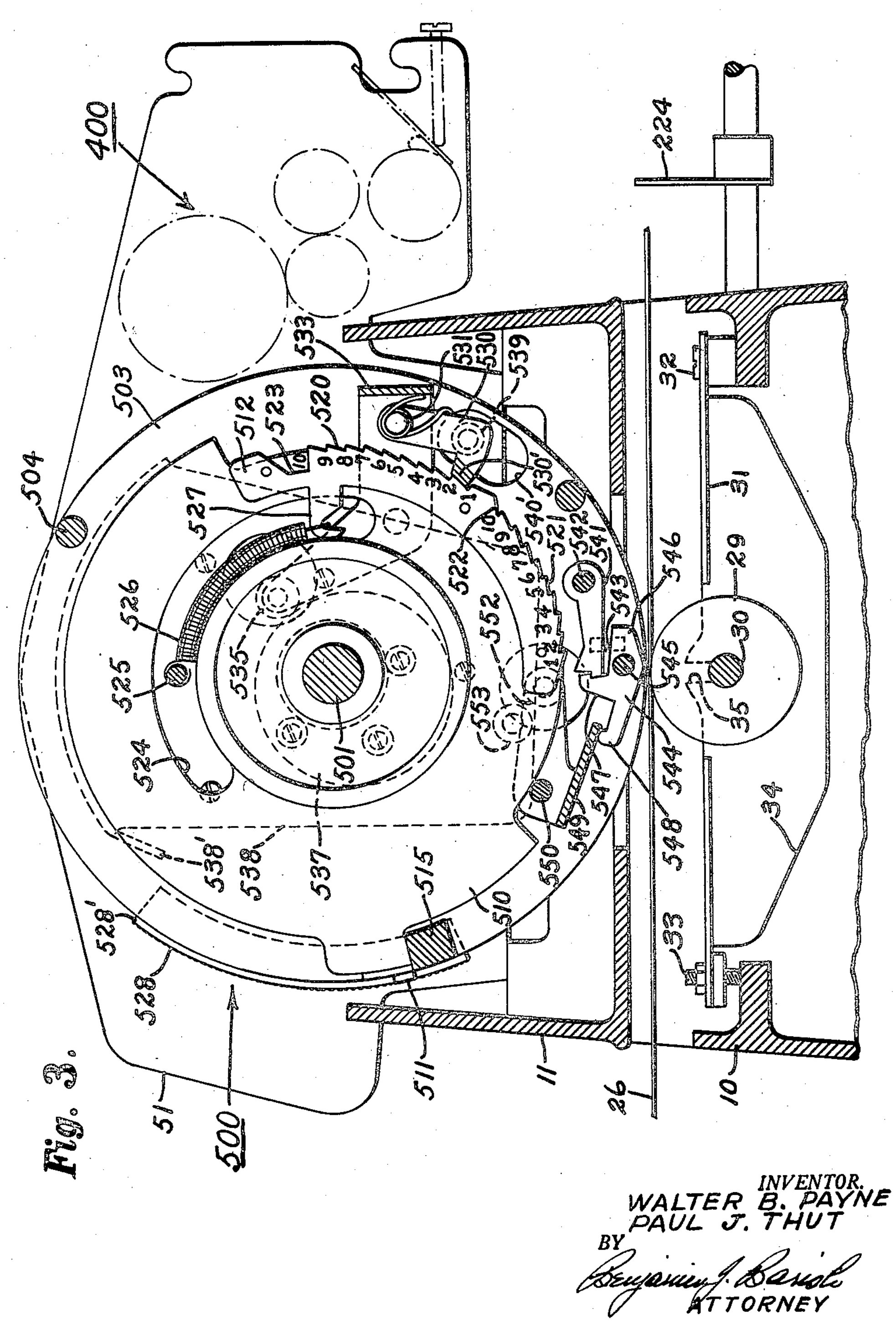
Fig. 3 is a side elevational view of the apparatus illustrated in Fig. 1 showing only one of the recording elements and the mechanisms associated therewith in their normal positions.

Referring first to Fig. 3, it will be seen that the apparatus incorporating the present invention comprises a base or frame 10 having a casing 11 mounted thereon which may be enclosed by a cover (not shown). Supported in casing 11 is the rotary recording cylinder incorporating the novel features of the present invention. This cylinder is designated as 300 in the above-cited Thut and Beachner application, and is herein designated as 500. A platen roller 29 is freely supported beneath the rotary recording cylinder by a stud 30 on a supporting member 31 secured to the base 10 by means of a screw 32 and an adjustable stud 33. The supporting member 31 is formed with oppositely disposed side portions 34 having slots 35 therein which receive flattened ends of the stud 30 to prevent the latter from rotating.

The record sheets, such as blank checks, to be impressed with the coded information from the rotary recording cylinder 500, are continuously fed by a belt 26 from the left side (Fig. 3) of the apparatus into recording position between platen 29 and the recording cylinder 500. As an individual check is fed by the belt into recording position, a cycle of rotation of the cylinder is initiated to bring recording elements carried on the circumference of the cylinder into rolling contact with the check.

The power means for driving the belt 26 and the recording cylinder 500 are adequately disclosed in the aforementioned Thut and Beachner patent application and form no part of the present invention. That application, as well as the Payne Patent No. 2,071,139, utilizes a clutch mechanism which is tripped by the entry of a check into the recording position to initiate a rotational cycle of the cylinder 500. Also disclosed therein is a stop mechanism which is actuated upon initiation of a rotational cycle of the cylinder to raise a stop element 224 into the path of the check to arrest the further movement of the check by the belt 26. During the rotational cycling of the recording cylinder, a sheet gripping member (to be hereinafter described in more detail) disposed along a part of the circumference of the recording cylinder grips the record sheet between it and the platen 29 to reverse the movement of the check as the recording cylinder makes rolling contact therewith. This reverse movement of the check is permitted by the automatic elevation of feeding rollers (not herein illustrated) during this part of the rotational cycle.

As the recording cylinder rotates, an inking fountain (designated 400 in both the aforementioned Thut and Beachner application, and herein), preferably containing a supply of a fluorescent ink compound, applies a thin and uniform coating of the ink to the recording elements of the cylinder. In the Thut and Beachner patent application, as well as herein, these recording elements to be hereinafter described in detail are carried by settable members of the cylinder and are set in differential positions with respect to the sheet gripping member to represent the coded information to be recorded. The arrangement is such that when the sheet gripping member first contacts the check, it is at the required predetermined distance from the leading edge of the check, as determined by the stop element 224, so that the application of the record impressions from the recording elements, during the further rotation of the cylinder and the reversal of movement of the check, will be in their proper data-representing differential positions from the leading edge of the check.

As the recording cylinder completes its cycle, the sheet gripping member carried thereby releases the check; the feeding rollers return into contact with the check thus restoring the original direction of feed of the check by the belt; stop element 224 returns to its lower position permitting the check to be ejected; and the apparatus is now in condition for another rotational cycle to be initiated in the same manner by a succeeding check.

All the foregoing structures and mechanisms of this illustrative embodiment are but briefly referred to herein as they do not form a part of the present invention. Further details of such structures and mechanisms which might be desired in connection with an understanding of the overall apparatus, but which are not necessary for an understanding of the present invention, may be had from the aforementioned Thut and Beachner patent application and Payne patent.

Figure 1:
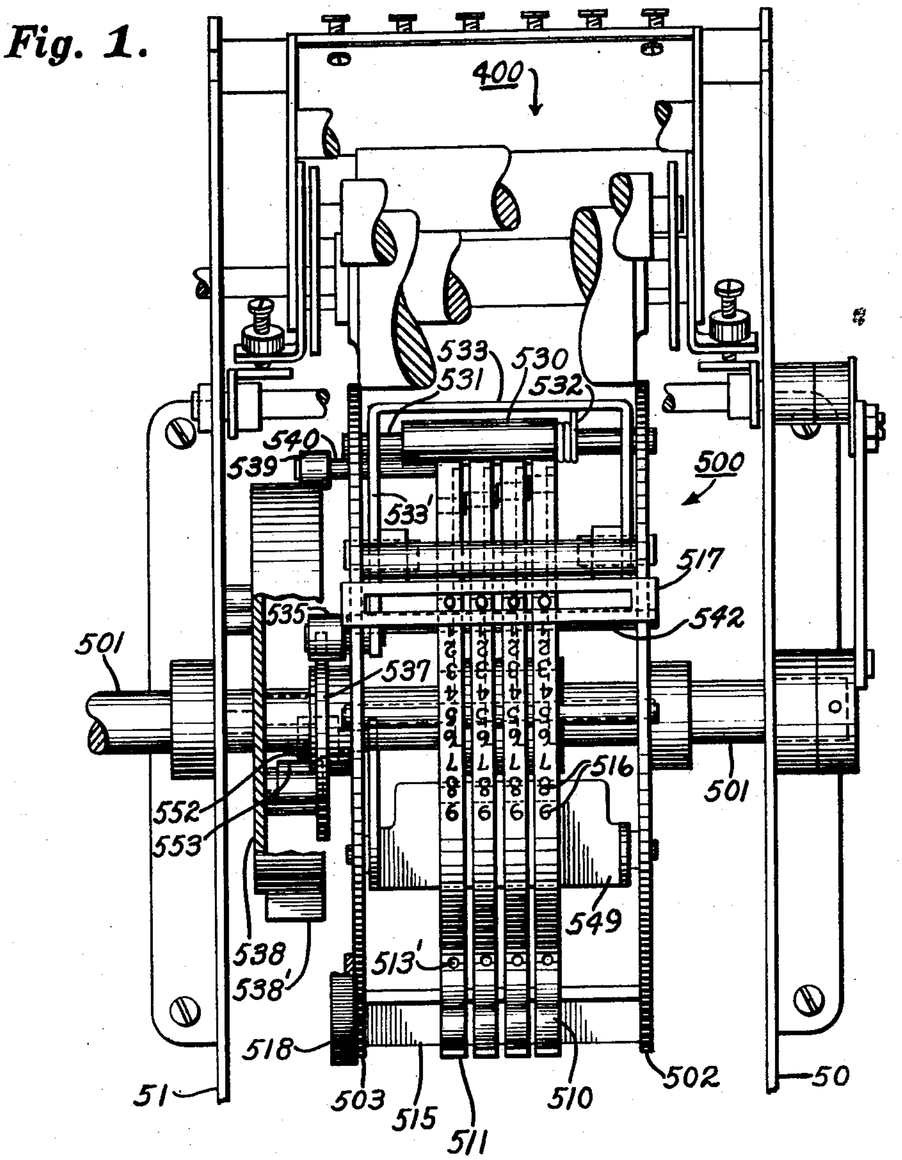
Fig. 1 is a top plan view of an embodiment of the invention as incorporated in the Thut and Beachner apparatus.
Figure 2:
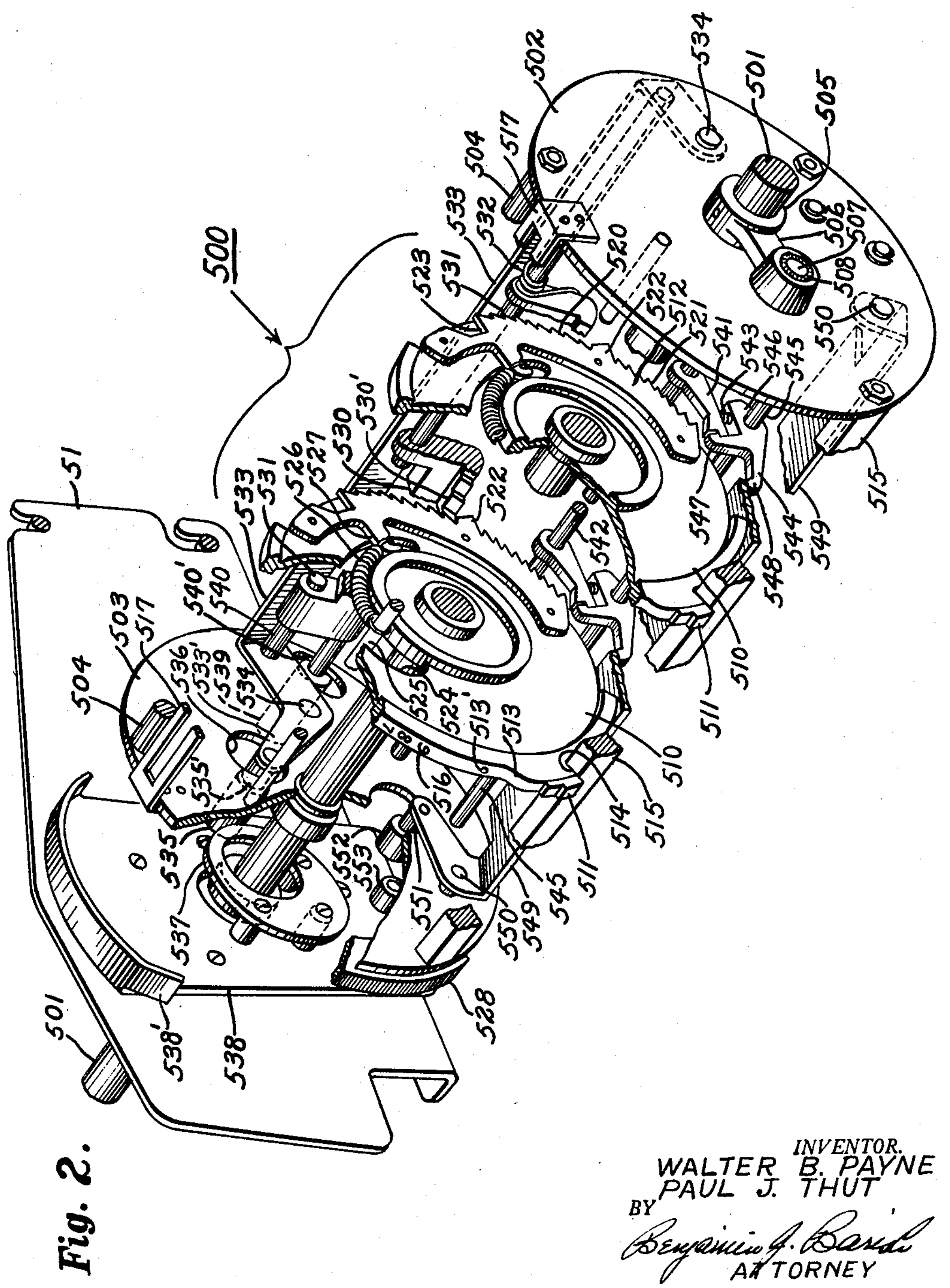
Fig. 2 is an exploded perspective view of the rotary recording cylinder of Fig. 1 incorporating the new mechanism of the present invention, this figure illustrating the mechanism in connection with only two of the recording elements for simplification purposes.

The rotary recording cylinder 500 incorporating the novel mechanisms of the present invention is best seen in the perspective view of Fig. 2. While the described cylinder incorporates four of the aforementioned recording elements (see Fig. 1), only two of such recording elements are illustrated in Fig. 2 for purposes of clarity.

Recording cylinder 500 is driven through its cycles of rotation by a shaft 501 which is coupled, through the clutch mechanism briefly referred to above, to the drive means. Cylinder 500 is comprised of a pair of circular end plates 502 and 503 secured together in spaced relationship by cross rods 504 and is freely mounted on drive shaft 501 between a pair of frame plates 50 and 51 (see Fig. 1) of the casing 11, in a similar manner as in the aforementioned Thut and Beachner application wherein the frame plates are correspondingly numbered. A coupling member 505 is fixed to drive shaft 501 and has an extension thereof 506 secured to end plate 502 of the cylinder by means of a stud 507 passing therethrough and fixed in the end plate. An insert 508 of shock absorbing material cushions this coupling between stud 507 and the extension 506. It will thus be seen that the rotary motion from drive shaft 501 is thereby transmitted by coupling member 505 to the recording cylinder 500.

The settable members 510 carried by the cylinder 500 are in the form of circular disks freely mounted on drive shaft 501 between the end plates 502 and 503 of the cylinder. In the embodiment described, there are four such settable members or disks 510 shown in Fig. 1, only two of such members being shown in Fig. 3 for purposes of clarity as mentioned above.

Each of the settable disks 510 carries a square-shaped recording element 511 and an indexing element or segment 512. Recording elements 511 are each formed to project from a semicircular ring 513 fastened to the circumferential surface of its respective disk 510. The rings 513 are formed with abutments 514 contiguous to their recording elements 511 which are adapted to rest against a limit bar 515 extending across the cylinder 500 and fastened to its end plates 502 and 503. As the disks 510 are freely mounted on the drive shaft 501 of the cylinder, they may be set manually, or automatically by the consecutive numbering mechanism, to position their respective recording elements 511 at different differential positions along the circumference of the cylinder 500. Rings 513 may be provided with number indicia 516 viewable through a slotted plate 517 fastened between the end plates 502 and 503 to indicate the settings of the recording elements.

The indexing segments 512 of the disks 510 are each provided with a series of notches 520 cooperable with the advancing pawl of the consecutive numbering mechanism to be described, and a series of retaining notches 521 cooperable with the retaining pawls of this mechanism also to be described. The two sets of notches are separated by a projecting camming surface 522, and further, one end of the indexing segment is formed with a deep notch 523, the purposes of these being described below.

Each of the settable disks 510 is further formed with a curved slot 524 in which is disposed a shaft 525 extending through the cylinder 500 and fastened to the end plates 502 and 503. The recording elements 511 of the disks 510 are urged to their normal or "zero" positions resting against limit bar 515 by return springs 526 fastened to shaft 525 and to depending lugs 527 of indexing segments 512.

The sheet gripping member, in the form of a curved plate 528, is secured to end plate 503 of the cylinder, and extends along a portion of the circumferential surface of the cylinder. Member 528 is formed with sheet gripping projections, produced by transverse grooves therein, extending substantially the same distance from the axis of rotation of the cylinder as recording elements 511, so that they will grip the record sheets and move them in the direction of rotation of the cylinder (which is reverse of the direction of feed by belt 26), as the recording elements apply the record impressions to the sheets.

The recording elements 511 are settable within the circumferential surface of the cylinder 500 occupied by sheet gripping member 528, and in differential positions with respect to the leading edge 528' (Fig. 3) of this member. The normal, or "0," position of the recording elements is against the limit bar 515, with the positions representative of the consecutively higher numbers extending in the direction of the leading edge 528' of sheet gripping member 528. Upon the rotation of the cylinder 500 during the recording cycle, leading edge 528' contacts the record sheet at a predetermined distance from a reference on the latter, which is taken as the leading edge of the check as it is fed through the apparatus. Proper registration of the check is effected by the position the stop element 224 (Fig. 3) arrests the check, stop element 224 being adjustable for this purpose in the manner disclosed, for example, in the aforementioned Patent No. 2,071,139. Accordingly, as the sheet gripping member 528 engages the check, the impressions representative of the highest numbers are first applied remote from the check leading edge, followed by the lower numbers towards the leading edge resulting in all the impressions applied to the check being in differential positions with respect to its leading edge.

Disposed within cylinder 500 are the means for advancing the recording elements 511 during each rotational cycle of the cylinder to represent consecutive numbering data. The advancing mechanism includes an elongated pawl 530 having a stepped nose 530' engageable with notches 520 of the indexing segments 512. Pawl 530 is freely supported on a shaft 531 and is normally urged by a spring 532 into engagement with the indexing notches 520 of the settable disks. Shaft 531 is pivotally mounted to the end arms of a bail 533, which is in turn pivotally supported between end plates 502 and 503 by a pair of studs 534. One arm 533' of bail 533 carries a cam roller 535 supported on a pin 535' extending through an aperture 536 in end plate 503 and rides on a surface of a stationary cam 537 pinned to a plate 538 fixed to the supporting frame member 51. The surface of cam 537 is shaped to provide a continuously increasing radius for the first 180° and a continuously decreasing radius for the second 180°, both with respect to the longitudinal axis of the cylinder.

It will thus be seen that as the cylinder rotates, cam roller 535, riding on stationary cam 537, will pivot bail 533 clockwise (in the direction of rotation of cylinder 500) about stud 534 during the first half-cycle of rotation. During this pivotal movement, the nose 530' of pawl 530 will advance settable disk 510 and the recording element 511 carried thereby one indexed position. In the second half-cycle of the cylinder, cam roller 535, riding along the continuously lowering surface of stationary cam 537, restores the original position of bail 533 by moving it counter-clockwise about pivot 534 to return pawl 530 back to its normal position. As disk 510 had been advanced one indexed position, the pawl would be seated in the next notch of indexing segment 512, in preparation for the advancement of the disk during the succeeding cycle.

Plate 538 is provided with a camming surface 538' in the form of a curved bent-over extension at the upper part thereof. Camming surface 538' cooperates with a roller 539 fixed to advancing pawl 530 by a pin 540 passing through an elongated opening 540' in end plate 503. The purpose of the foregoing mechanism is to disengage pawl 530 from indexing segment 512 during the cycle but after the settable disk has been advanced one indexed position, the latter being retained in its new indexed position by retaining mechanism to be described.

The retaining mechanism includes a pawl 541 seatable in the retaining notches 521 of each of the settable disks 510. All the retaining pawls 541 are pivotally supported from a shaft 542 extending through the cylinder and fastened to the end plates 502 and 503. The pawls 541 are urged into engagement with the retaining notches 521 by springs 543, but are normally latched in disengagement position by latching elements 544 for each of the pawls. Latching elements 544 are pivotally supported on another shaft 545 fastened to the end plates of the cylinder and carry on one arm thereof 546 the springs 543. A second arm 547 of the latching elements is formed with a latching nose engageable with its respective retaining pawl 541 to latch the same in its lowered or disengagement position. A third arm 548 of the latching elements 544 is cooperable with a bail 549 pivotally supported by end plates 502 and 503 by studs 550. One end of bail 549 is extended and carries a pin 551 passing through an opening in end plate 503 and terminating in a roller 552. During the early part of the cycle, roller 552 contacts a pin 553 fixed to stationary plate 538 to pivot the bail 549 downwardly about its studs 550 thereby rocking all the latching elements 544 counter-clockwise about their shaft 545 to unlatch all retaining pawls 543. The latter pawls are thereby free to seat into their respective retaining notches 521, under the influence of springs 543, to retain the settable disks 510 in their indexed positions while the advancing pawl 530 is disengaged from the indexing notches 520 as described above.

As will be set forth below in a detailed description of the overall operation, the first order settable disk 510 is advanced one indexed position during each cycle of the cylinder 500, and during cycles requiring a carry-over to the next order disk, the next higher order disk will be advanced one indexed position (to record e.g. "1") and the lower order disk will be restored to its normal position (to record e.g. "0"). The deep notch 523 in each of the indexing segments 512 enables the higher order disk to be advanced on a carry-over operation, and the cam surface 522 on indexing segment 512 enables the lower order disk to be restored to "0" during that cycle, both of which operations will be described below in detail.

As will be seen in Fig. 2, nose 530' of the advancing pawl 530 is provided with a plurality of steps, one for each of the settable disks 510. The step engageable with the indexing notches of the "units" disk (the left-most disk illustrated in Fig. 2) is longest, the succeeding steps decreasing in length in correspondence with the increasing order of the remaining settable disks with which they are engageable. That is, there being four settable disks in the embodiment disclosed, the nose 530' of the advancing pawl is formed with four steps, the step for the units order disk (left-most in Fig. 2) being the longest, that for the tens order being slightly shorter, that for the hundredth order being slightly shorter than the preceding one, and the step for the thousandth order disk being the shortest. During those machine cycles that advance the units order disk from "0" to "9," the longest step of the advancing pawl nose is engaged in indexing notches 520 of the disk for advancing same, but the succeeding steps, being shorter, do not engage the indexing notches of the higher order disks and therefore such higher order disks are not advanced. However, in a carry-over cycle, the longest step will be seated in the deep notch 523 for the units disk, whereupon the second step of the advancing pawl nose will be permitted to engage an indexing notch of its respective disk (the tens order) to advance same one indexed position. In the same manner, successive carry-over cycles further advance the tens order disk to its "9" position followed by a carry-over to the hundreds order disk, and so on through all four orders.

During a carry-over cycle and before the recording elements contact the check, the disk that had been advanced to its "9" position in the preceding cycles is normalized or returned to its "0" position under the influence of return spring 526. This is accomplished by the camming surface 522 in the following manner. First, it will be recalled that advancing pawl 530 indexes the disks during the first half-cycle, and is disengaged from the disks by cam plate 538' during the second half-cycle. Also, it will be recalled that at the early part of each cycle (about 12°), retaining pawl 541 is unlatched by latching element 544. This permits this pawl to rise and seat in retaining notches 521 of the disk for the remainder of the cycle, which thereby retains the disk in its indexed position against spring 526 during that portion of the cycle that the advancing pawl is disengaged from the disk. During a carry-over cycle, however, the disk will have been indexed to the position where the retaining pawl 541 is engaged by the camming surface 522. The latter relatches the retaining pawl during the indexing of the disk, and thereby prevents that pawl from rising and seating in one of the retaining notches 521. Accordingly, during the second half-cycle of a carry-over cycle, when advancing pawl is disengaged from the indexing notches 520, there is nothing to retain the disk from returning to its normal position against limit bar 515 under the influence of return spring 526. The return spring thereby normalizes the disk 510 and its recording element 511 to their "0" position.

Following is a description of the operation for serially numbering in coded form a batch of checks. If the consecutive numbering is to begin with "0001," the operator would first set all the disks 510 to their "0" positions. This may conveniently be accomplished by turning all the disks to their "9" positions and rotating the cylinder one revolution at which time they will be advanced one position to bring them all to "0" by the carryover operation described above. For setting the disks to "9," the disks may be moved manually by an instrument having a pointed or hooked end inserted in small apertures 513' (Figs. 1 and 2) formed in the semicircular rings 513 of all the disks. Manual setting of the disks in this direction (i.e. clockwise, in the same direction as their advancement) is permitted as the advancing pawl 530 and the retaining pawls 541 will ride over the two sets of notches of the indexing segments 512. The disks may be similarly set to begin with any specific number by setting them in positions to represent that number less "one," as viewed through the sight opening of slotted plate 517, the disks being automatically advanced one indexed position during the first half-cycle of the cylinder and before the recording elements are applied to the first check.

Figure 4:
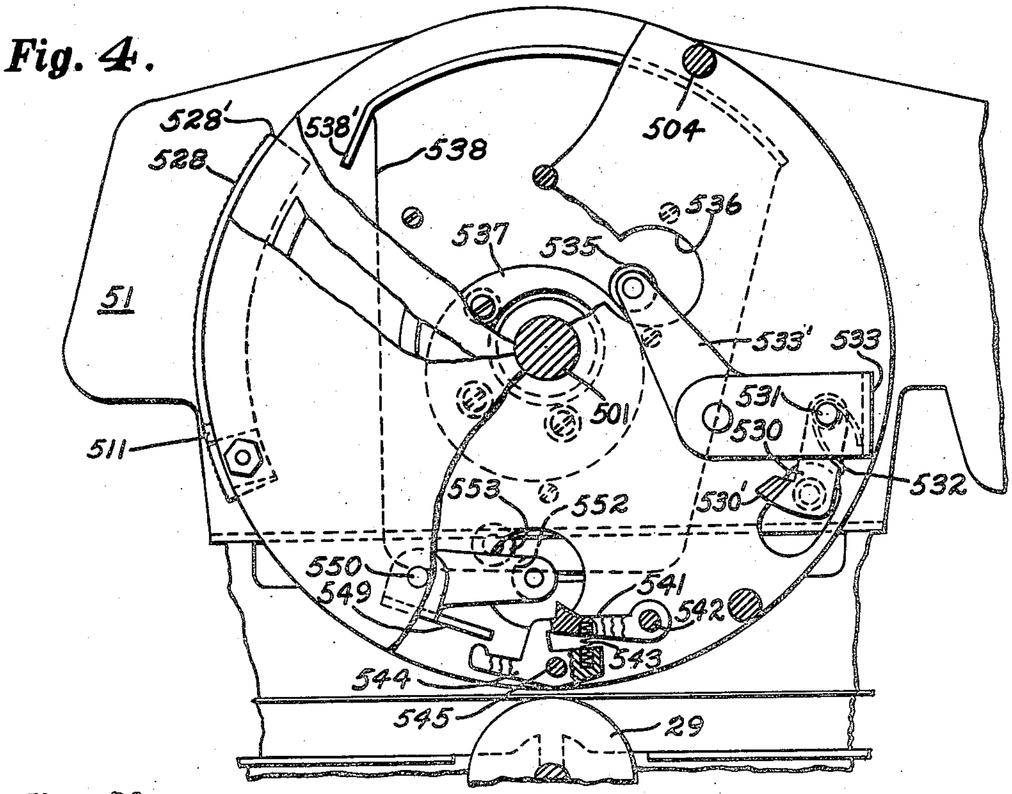
Fig. 4 is a side elevational view similar to Fig. 3 but with parts removed to illustrate the various cams for controlling the consecutive numbering mechanism.

Fig. 3 illustrates the unit disk 510 set in its "0" position at the beginning of the first cycle of the apparatus, with the advancing pawl 530 seated in the first of the indexing notches 520 and with the retaining pawl 541 latched in its lowered or disengaging position. It matters not whether pawl 541 is latched downwardly (Fig. 3) or unlatched (Fig. 4). Fig. 4 also illustrates the relationship of stationary cam 537 with respect to the advancing pawl roller 535, and the relationship of the retaining pawl 541 and its latching mechanism with respect to stationary stud 553 which cooperates therewith.

In Fig. 3, the indexing notches 520 of indexing segment 512 are numbered to represent the notch in which the advancing pawl 530 will be seated at the beginning of the cycle designated by that number, and similarly the retaining notches 521 are numbered to designate the notch in which the retaining pawl 541 will be seated at the beginning of that particular cycle. It will be understood that a retaining notch is not necessary for position "1" of the retaining pawls 541 since limit bar 515 would prevent the disk from moving. It will also be understood from the foregoing description, that since the advancement of disk 510 during the cycle is effected before its recording element is impressed against the check, the setting of the record element 511 at the beginning of the cycle will be representative of "one" less than the number designated by the two sets of notches.

As briefly described above, the first cycle of rotation of cylinder 500 is initiated by a check entering the recording position between the cylinder and platen 29. During the early part of the cycle, at about 12° of the rotary movement, all retaining pawls 541 are unlatched (in the event one or more had been previously latched) by roller 552 contacting pin 553 to rock bail 549 clockwise, which in turn rocks all the latching elements 544 counterclockwise to disengage all the retaining pawls. The pawls are thus permitted to rise under the influence of their springs 543 and rest against the indexing segments 512 of the settable disks at the indicated "1" position of retaining notches 521.

Figure 5:
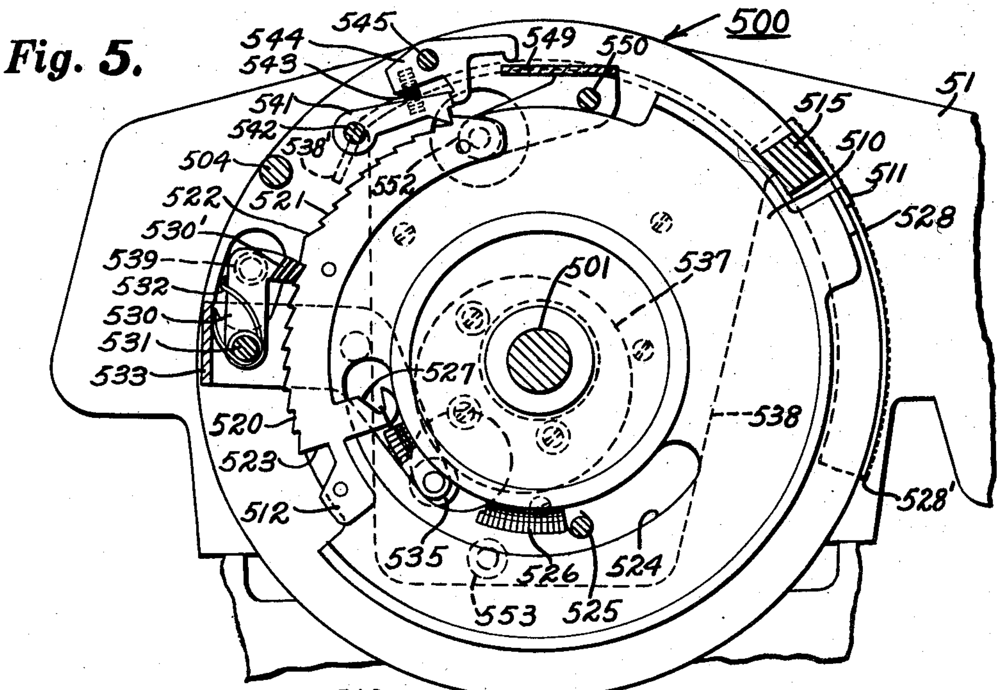
Fig. 5 is a similar side elevational view illustrating the positions of elements of the mechanism during the first cycle of the apparatus.

During the first 180° of the rotary movement, cam roller 535 rides on the continuously elevating surface of stationary cam 537 to rock advancing pawl 530 in the direction of rotation of the cylinder (i.e. clockwise), which thereby advances the settable disk 510 and its recording element 511 one indexed position. It will be recalled that only the units disk is so advanced during the first cycle since the nose 530' of the advancing pawl is seated and engageable with an indexing notch of only the units disk. The retaining pawl 541 for the units disk thus seats in the next notch (designated "2," Fig. 3) of retaining notches 521, wherein it will remain for the remainder of the cycle. Fig. 5 illustrates the positions of the foregoing elements at about the 180° point of the first cycle.

Figure 6:
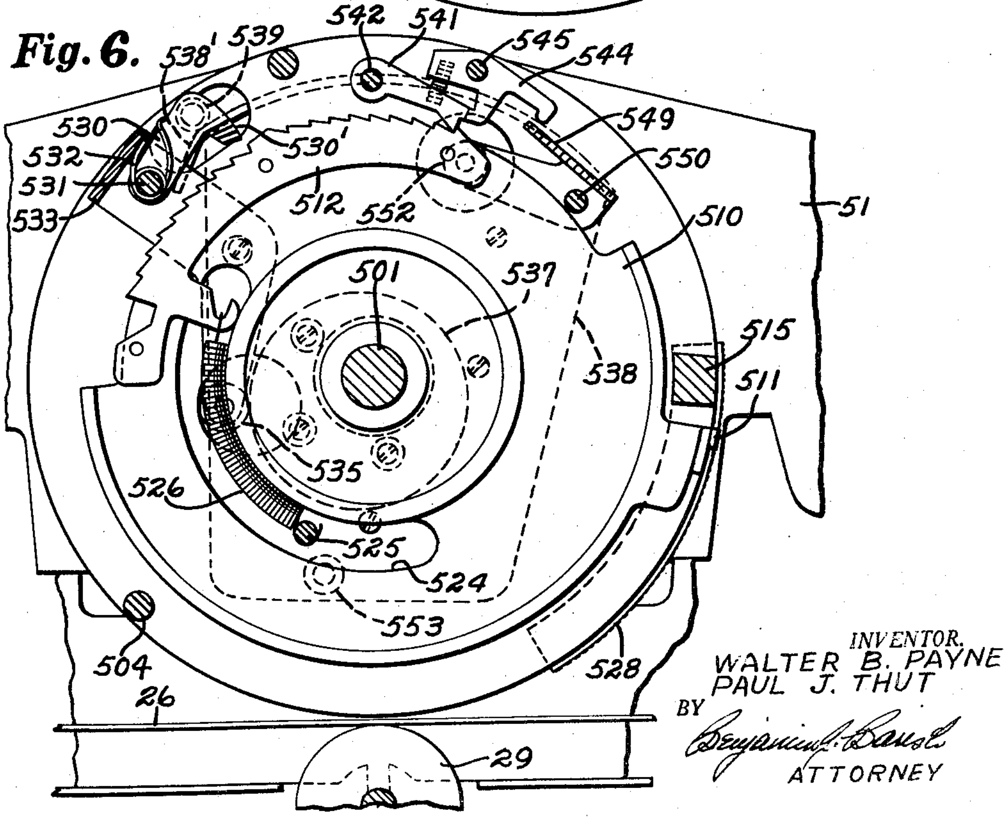
Fig. 6 is a similar side elevational view illustrating the mechanism further in the first cycle.

At about 205° of the cycle, advancing pawl 530 is pivoted out of its indexing notch by the engagement of roller 539 on cam surface 538' of stationary plate 538. The disk is retained in its advanced position against the influence of return spring 526 by retaining pawl 541. The positions of the foregoing elements at this point in the cycle are illustrated in Fig. 6.

Figure 7:
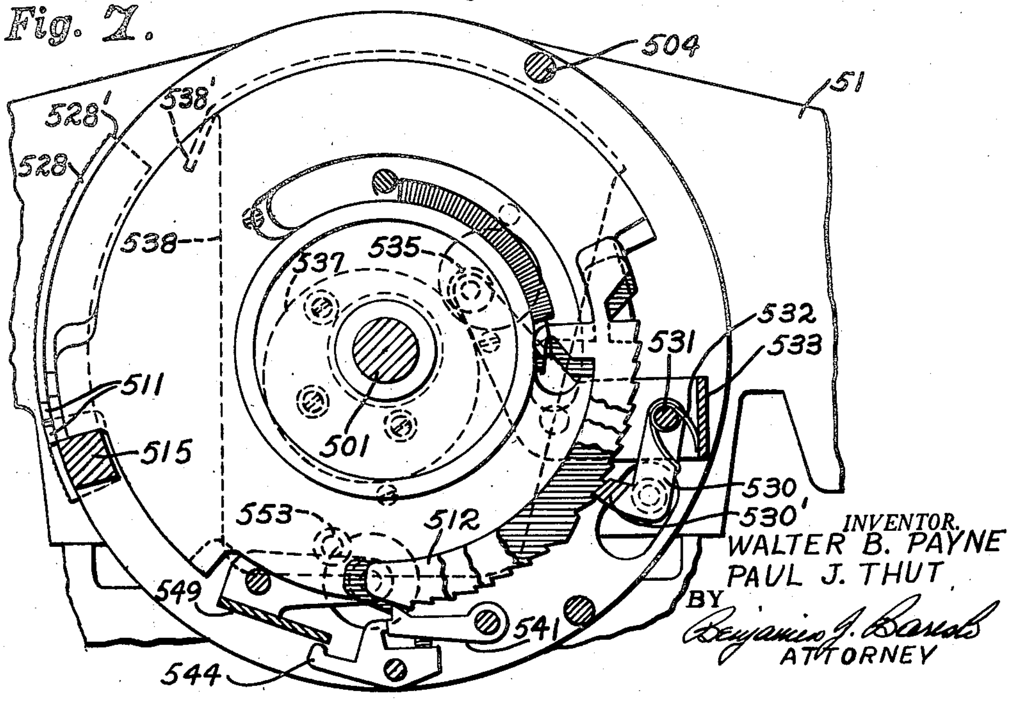
Fig. 7 is a similar side elevational view illustrating the mechanism at the end of the first cycle of operation of the apparatus.

It will be recalled that during the second half-cycle, advancing pawl 530 is restored from its pivoted position to its normal position with respect to the settable disks by cam roller 535 riding along the continuously lowering surface of cam 537. At about the 300° point of the cycle, roller 539 clears cam surface 538' to permit the advancing pawl to return against the indexing segment 512 wherein it will seat at the completion of the cycle in indexing notch designated "2" (Fig. 3) of the units disk, the latter having been advanced one position. Fig. 7 illustrates the mechanism at the end of the first cycle and the beginning of the second.

The printing by the recording elements 511 is effected from about 230° to about 280° of the rotary cycle, which is, as mentioned above, after the advancement of the disks the one indexed position by the foregoing advancing mechanism. The disks are retained, or locked, during printing by retaining pawls 541. It will thus be appreciated that the record impressions applied to the check during this first cycle of the cylinder are representative of the number originally set in the disks ("0000") at the beginning of the cycle, plus one, i.e. "0001."

The foregoing operations during the first cycle of the cylinder are repeated for the next eight cycles, each cycle being initiated by the entry of a check into the recording position, and each cycle advancing the units disk 510 one indexed position.

Figures 8, 9:
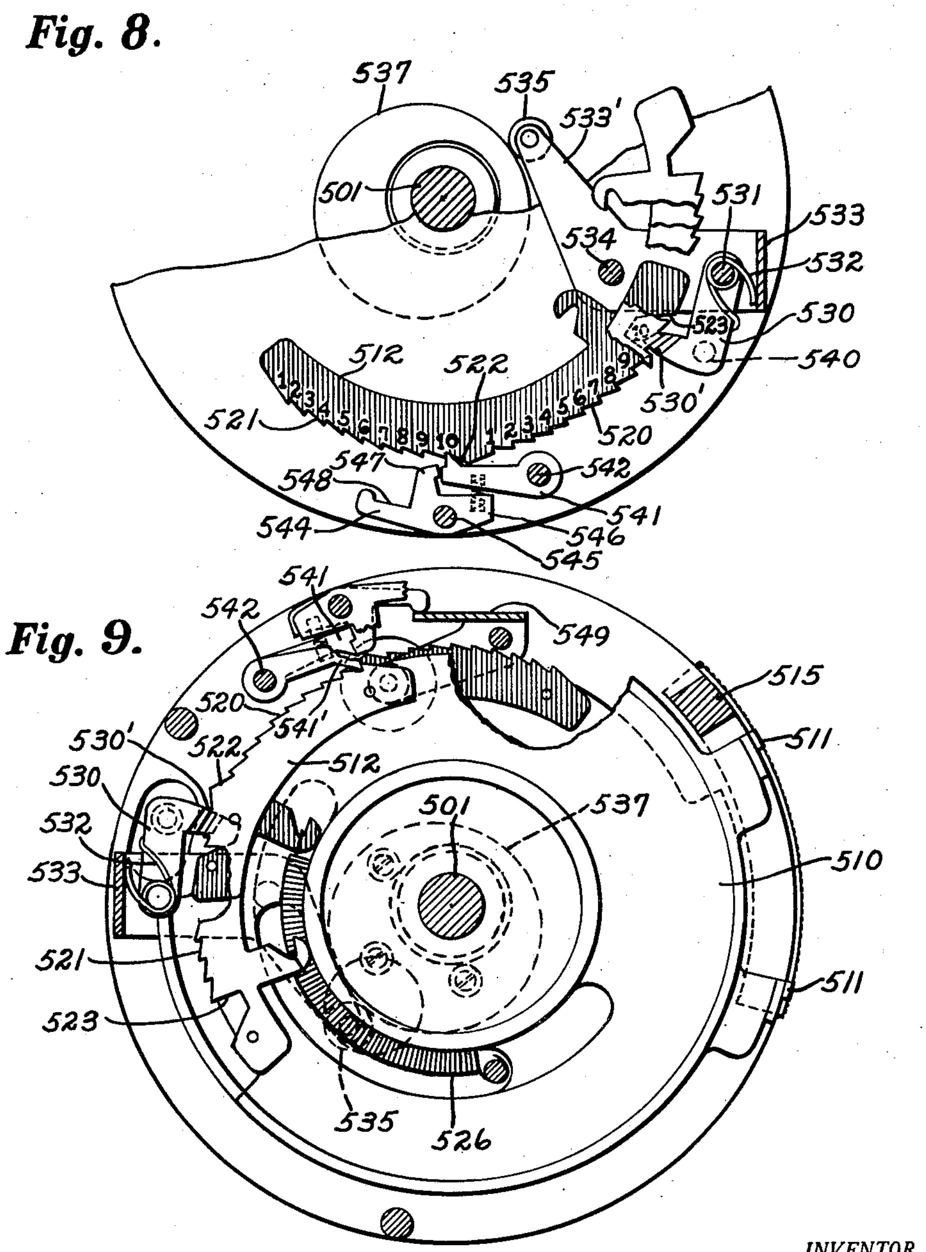
Fig. 8 is a fragmentary side elevational view illustrating the mechanism at the beginning of a carry-over cycle of the apparatus.
Fig. 9 is a side elevational view illustrating the mechanism during the carry-over cycle of the apparatus.

Fig. 8 illustrates the positions of the advancing and retaining mechanisms with respect to the indexing segments 512 at the beginning of the tenth cycle, which is to effect a carry-over from the units disk to the tens disk, and a restoration of the units disk to its normal or "0" position. It is seen that the advancing pawl 530, at the beginning of the tenth cycle, is seated in the deep notch 523 of the indexing segment for the units disk, and the retaining pawl 541 is unlatched and is seated in the notch designated "10" of the retaining notches 521. It will also be understood that the indexing segments 512 for all the disks other than the units disk are in their "0" position illustrated in Fig. 3, since only the units disk had been advanced during the preceding nine cycles.

At the beginning of the carry-over cycle, since stepped nose 530' of the advancing pawl 530 is seated in deep notch 523 of the units disk, the second step of the pawl will be seated in the first notch of the indexing notches 520 for the tens disk. Accordingly, during the first half-cycle where the advancing pawl indexes the disk one position, as described above, the tens disk will be indexed the one position and will be latched in its indexed position by its corresponding retaining pawl.

Also, since the nose of the indexing pawl 530 bears against the side of deep notch 523 for the units disk, the latter disk will also be indexed one position during the first half-cycle. When the latter disk is so indexed, cam surface 522 will engage the retaining pawl 541 for the units disk, moving it downwardly, whereupon it will be latched by its latching element 547 as described above. Fig. 9 illustrates the positions of the foregoing mechanisms during the tenth cycle after the advancing pawl 530 has indexed both the units and tens disk, whereupon the retaining pawl 541 for the units disk is latched in its disengagement position and the retaining pawl for the tens disk 541′ is seated in the notch of its respective indexing segment. At about the 205° point of that cycle when the advancing pawl 530 is pivoted out of its indexing notch by roller 539, there is no longer anything present to retain the units disk, whereupon it will be returned to its "0" position by its return spring 526. As the printing by the recording elements is effected from about 230° to about 280° of the rotary cycle, which is subsequent to the return of the units disk, the impressions applied to the check during this tenth cycle will be representative of "0010."

Subsequent cycling of the cylinder 500 will index the units disk through "9" in the manner described above, followed by carry-over cycles further advancing the tens order disk to "9," the next succeeding carry-over cycle effecting a carry-over to the hundreds order disk and so on through all four orders.

The invention has been described for illustrative purposes as embodied in the aforementioned code recording apparatus of the Thut and Beachner application, as this is presently considered to be a preferred embodiment. However, it will be appreciated that the recording elements of the disclosed apparatus could be used for applying the record impressions in forms other than fluorescent ink markings. For example, as mentioned in the Thut and Beachner application, the recording elements could be arranged to perforate the record sheet, which could be conveniently accomplished by the provisions of a rotary apertured die synchronously driven with cylinder 500, in lieu of platen 29. Also, the markings could be in forms other than fluorescent ink, such as opaque, conductive or magnetic ink markings. Furthermore, the consecutive number advancing mechanism of the present invention is not restricted for use with coding apparatus, but may be used for advancing conventional printing elements of other types of recording or printing devices. It will also be appreciated that the timing of the various functions and operations in the disclosed apparatus could be varied, as for example, by effecting the advancement of the recording elements after the recording part of the cycle, rather than before as herein illustrated. Further applications, variations and modifications of the disclosed apparatus will be apparent to those skilled in the art which are intended to be within the scope of the invention as defined in the following claims.

We claim:

1. Recording apparatus comprising a rotary member and means for driving same through rotational recording cycles, a plurality of settable disks each carrying a recording element settable to differential positions along a portion of the circumference of the rotary member, a limit engageable by the recording elements for determining their normal positions, resilient means for urging said recording elements against said limit, a member formed with indexing notches and retaining notches carried by each of said disks, first pawl mechanism engageable with said indexing notches for advancing the recording elements to different differential positions during a rotational cycle of the rotary member to represent consecutive numbering data, second pawl mechanism engageable with said retaining notches for retaining the recording elements in their advanced positions during recording, and means for disabling said second pawl mechanism of an individual disk after its recording element has been advanced a predetermined number of differential positions to permit the resilient means to restore said recording element to its normal position against said limit.

2. Recording apparatus comprising a rotary member and means for driving same through rotational recording cycles, a plurality of recording elements each adapted to record an impression on a record sheet, each of said recording elements being settable to differential positions along the circumference of the rotary member to represent data to be recorded, a limit engageable by the recording elements for determining their normal positions, resilient means for urging said recording elements against said limit, mechanism for sequentially advancing said recording elements one differential position during each rotational cycle of the rotary member to represent consecutive numbering data, retaining means for each of said recording elements to retain same in their advanced positions during the recording operation, and means for disabling the retaining means of a recording element in a cycle effecting a carry-over to permit said resilient means to restore the recording element to its normal position against said limit.

3. Recording apparatus comprising a rotary member and means for driving same through rotational recording cycles, a plurality of orders of settable recording elements on the circumference of the rotary member, a limit engageable by the recording elements for determining their normal positions, resilient means for urging each order of said recording elements against said limit, mechanism for sequentially advancing said recording elements during each rotational cycle of the rotary member to represent consecutive numbering data, retaining means for each order of said recording elements to retain same in their advanced positions, and means for disabling the retaining means of an individual order of the recording element in a cycle effecting a carry-over to the next higher order, to permit said resilient means to restore said individual order of the recording elements to its normal position against said limit.

4. Recording apparatus comprising a movable member and means for driving same through recording cycles of operation, a plurality of orders of settable recording elements carried by the movable member, a limit engageable by the recording elements for determining their normal positions, resilient means for urging each order of said recording elements against said limit, mechanism for sequentially advancing said recording elements during each cycle of the movable member to represent consecutive numbering data, retaining means for each order of said recording elements to retain same in their advanced positions, and means for disabling the retaining means of an individual order of the recording elements in a cycle effecting a carry-over to the next higher order, to permit said resilient means to restore said individual order of the recording elements to its normal position against said limit.

5. Recording apparatus as defined in claim 4 wherein said disabling means includes a cam surface provided on each order of the recording elements engageable with said retaining means for movement of the latter thereby, and a latching means for latching said retaining means in its moved position.

6. Recording apparatus comprising a movable member and means for driving same through recording cycles of operation, a plurality of orders of settable recording elements carried by the movable member, each of said orders being provided with a plurality of indexing notches, a plurality of retaining notches and a projecting cam surface, a limit carried by said movable member and engageable by the recording elements for determining their normal positions, resilient means for urging said recording elements against said limit, first mechanism engageable with said indexing notches for sequentially advancing the recording elements during each cycle of the movable member to represent consecutive numbering data, second mechanism for each order of said recording elements urged to engage said retaining notches to retain the recording elements in their advanced positions during recording, said second mechanism being engageable with said projecting cam surface of an individual order of the recording elements in a cycle effecting a carry-over to the next higher order, to be disabled thereby from retaining said individual order of the recording elements and to permit said resilient means to restore said individual order to its normal position against said limit, and latching means for latching said retaining means in its disabled position.

7. Recording apparatus as defined in claim 6 further including means for disengaging the advancing mechanism from the indexing notches of the settable recording elements during the portion of a carry-over cycle when the retaining mechanism is disabled, whereby the restoration of said individual order of the recording elements will be effected when the advancing mechanism is disengaged.

8. Recording apparatus as defined in clam 6, wherein each order of said recording elements is further provided with a deep notch, and wherein said sequentially advancing mechanism comprises a pawl having a stepped nose each step of which is seatable in the indexing notches of one order of the settable recording elements when advancing same, said steps being seatable in the deep notch of its respective order of the settable elements during a carryover cycle thereby permitting the step of the next higher order to seat in an indexing notch of its respective order of the recording elements and effecting an advance thereof during that cycle.

9. Recording apparatus comprising a rotary member and means for driving same through rotational recording cycles, a plurality of settable disks carrying recording elements settable along the circumference of the rotary member, a limit engageable by the recording elements for determining their normal positions, resilient means for urging said recording elements against said limit, a member formed with indexing notches and retaining notches carried by each of said disks, first pawl mechanism engageable with said indexing notches for advancing said recording elements in the first half-cycle of the rotary member to represent consecutive numbering data, second pawl mechanism engageable with said retaining notches for retaining said recording elements in their advanced positions during recording in the second half-cycle, a cam surface carried by each of said disks for disabling said second pawl mechanism of an individual disk during a cycle effecting a carry-over to the next higher order disk, and means for disengaging said first pawl mechanism from its indexing notches during the second half-cycle and before recording, whereby said resilient means is permitted to restore said individual disk to its normal position against said limit before recording during a carry-over cycle.

10. Recording apparatus comprising a rotary member, a plurality of code recording elements carried on the circumference of the rotary member, each of said recording elements having the same configuration for recording the same impression on a record sheet and each being settable to different differential positions along the circumference of the rotary member to represent data to be recorded, means for driving said rotary member through rotational recording cycles to record during each cycle differentially-positioned impressions on a record sheet corresponding to the positions of the recording elements on the rotary member, and indexing mechanism cooperable with the rotary member for automatically advancing said recording elements for each cycle of the rotary member to new differential positions to represent consecutive numbering data.

11. Recording apparatus comprising a rotary member, a plurality of code recording elements carried on the circumference of the rotary member, each of said recording elements having the same configuration for recording the same impression on a record sheet and each being settable to different differential positions along the circumference of the rotary member to represent data to be recorded, means for driving said rotary member through rotational recording cycles to record during each cycle differentially-positioned impressions on a record sheet corresponding to the positions of the recording elements on the rotary member, a member formed with indexing notches and retaining notches carried by each of said recording elements, pawl mechanism engageable with the indexing notches for automatically advancing said recording elements to new differential positions during each rotational cycle of the rotary member to represent consecutive numbering data, and means engageable with the retaining notches for retaining said recording elements in their advanced differential positions during recording.

12. Recording apparatus comprising a rotary member, a record sheet gripping device extending along a portion of the circumference of the rotary member, a plurality of settable disks disposed within the rotary member, each of said disks carrying a similarly configured code recording element settable to different differential positions along the portion of the circumference of the rotary member occupied by said record sheet gripping device to represent data to be recorded, means for driving said rotary member through rotational recording cycles to record differentially-positioned impressions on a record sheet, when engaged by the sheet gripping device, corresponding to the positions of the recording elements on the rotary member, a member formed with indexing notches and retaining notches carried by each of said recording elements, pawl mechanism engageable with the indexing notches for automatically advancing said recording elements to new differential positions during each rotational cycle of the rotary member to represent consecutive numbering data, and means engageable with the retaining notches for retaining said recording elements in their advanced differential positions during recording.

References Cited in the file of this patent

UNITED STATES PATENTS

| | | |
|---|---|---|
| 1,180,331 | Stamatson | Apr. 25, 1916 |
| 1,208,642 | Pitney | Dec. 12, 1916 |
| 1,222,306 | Krauth | Apr. 10, 1917 |
| 1,959,186 | Welter | May 15, 1934 |
| 2,022,136 | Payne | Nov. 26, 1935 |
| 2,116,609 | Shomaker | May 10, 1938 |
| 2,516,721 | Persson | July 25, 1950 |
| 2,655,098 | Dutro | Oct. 13, 1953 |

FOREIGN PATENTS

| | | |
|---|---|---|
| 467,445 | Great Britain | June 17, 1937 |